Dec. 15, 1942.   C. S. ASH   2,304,774
DUAL WHEEL ASSEMBLY
Filed Feb. 11, 1941   2 Sheets-Sheet 1

INVENTOR
Charles S. Ash
BY
Morgan, Finnegan & Durham
ATTORNEYS

Dec. 15, 1942.   C. S. ASH   2,304,774
DUAL WHEEL ASSEMBLY
Filed Feb. 11, 1941   2 Sheets-Sheet 2

INVENTOR
Charles S. Ash
BY
Morgan, Finnegan & Durham
ATTORNEYS

Patented Dec. 15, 1942

2,304,774

UNITED STATES PATENT OFFICE 2,304,774

DUAL WHEEL ASSEMBLY

Charles S. Ash, Milford, Mich.

Application February 11, 1941, Serial No. 378,344

12 Claims. (Cl. 188—18)

The present invention relates to new and improved dual wheel and brake assemblies particularly adapted for use with automotive road vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
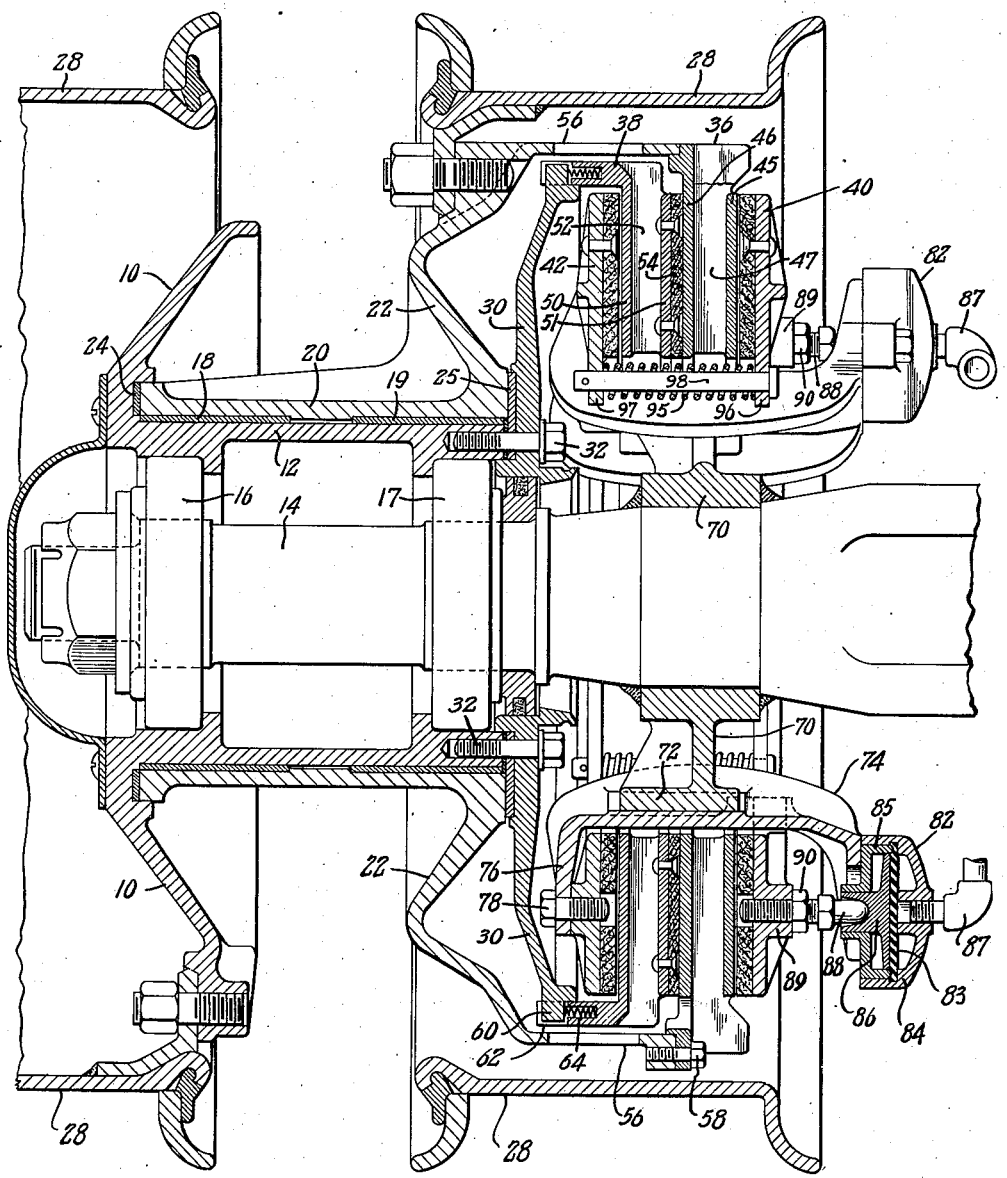
Figure 2:
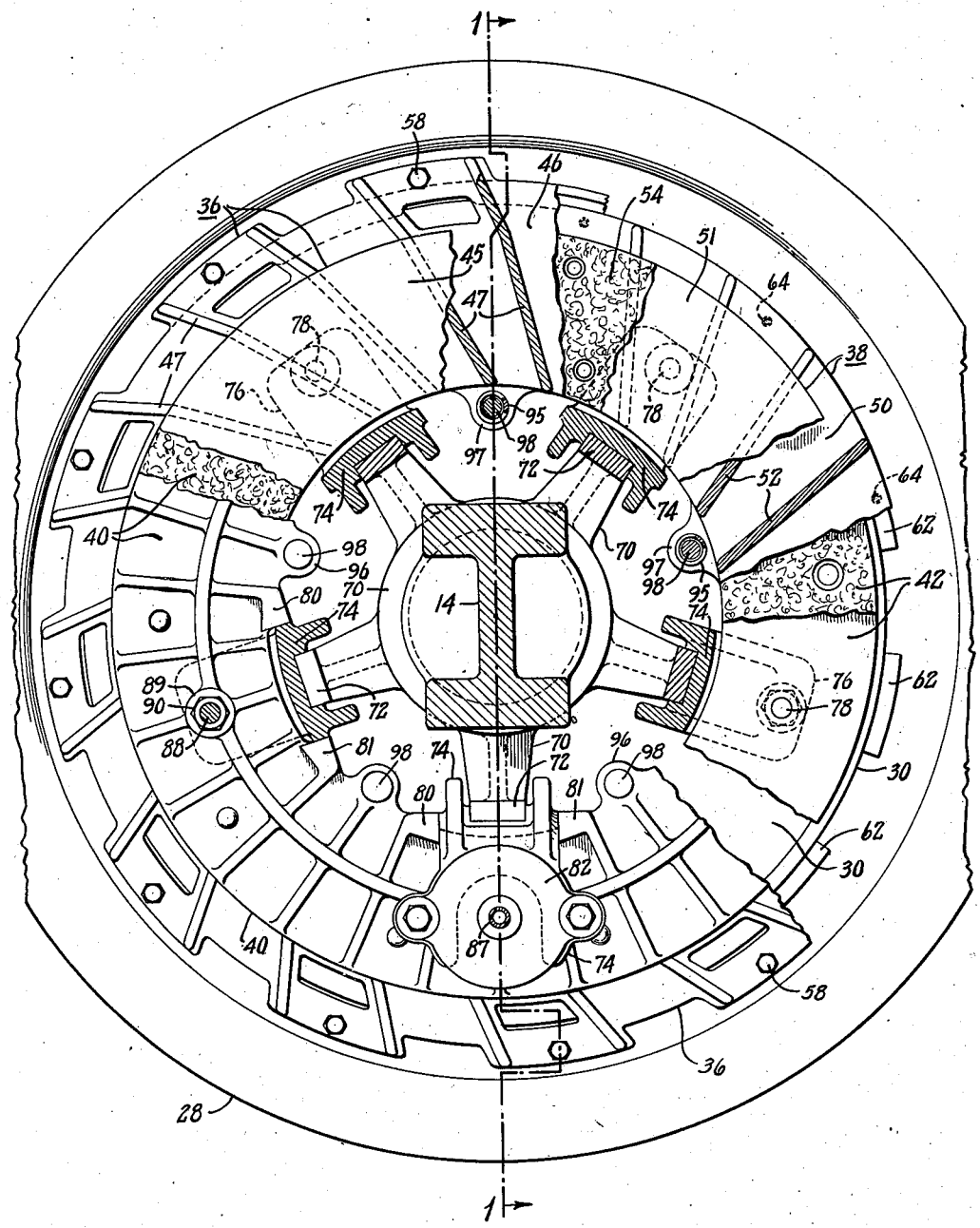

Of the drawings:

Figure 1 is a fragmentary vertical section showing a typical and illustrative embodiment of the present invention as applied to a trailing or non-driven axle; and Figure 2 is a view looking from the right of Figure 1, with certain parts being broken away and others being shown in section.

The present invention has for its object the provision of a novel and improved independently rotatable dual wheel and brake assembly particularly adapted for use with automotive road vehicles. A further object of the invention is the provision of an improved dual wheel assembly comprising independently rotatable dual wheels and individual brakes for the dual wheels, in which the thrust on the bearings between the wheels during braking is reduced to a minimum. The invention also provides an improved brake structure for independently braked dual wheels in which independently rotatable brake members are forced into contact with each other by frictional engagement with the brake shoes, so that their relative rotation, as well as their absolute rotation, is easily and effectively retarded. Still another object of the invention is the provision of a brake assembly for dual wheels in which the brake members rotating with the wheels produce a relatively powerful flow of air interiorly of the braking members, so that the frictional heat generated during braking is dissipated not only from the exterior of the brake but from their interior as well.

Referring now to the illustrative embodiment of the invention, braking members are provided to rotate with the dual wheels, and each is formed with interior air passages of considerable surface area extending in a generally radial direction to create a relatively powerful circulation of air interiorly of the braking member as the wheels and brakes rotate. The braking members are positioned between disc-like braking shoes which are axially movable towards each other and into contact with the opposite faces of the braking members, the brake shoes being held against rotation so that the rotation of the braking members and dual wheels may be retarded. Preferably, the usual friction material is secured to the adjacent faces of the brake shoes, and contacts with the plain metal surfaces of the braking member, thereby providing the greatest possible cooling action on those parts which are subject to the greatest heat. The exterior faces of the disc-like brake shoes are preferably exposed to the atmosphere for cooling, and may be ribbed not only to increase their strength and resistance to warping, but also to increase their heat dissipating quality.

Two rotatable braking members are provided, one for each of the dual wheels, the braking members are positioned coaxial with respect to each other and the wheels, and are adapted to be brought into contact with each other on at least their adjacent faces as the brake is applied. The adjacent faces of these rotating members may be provided with suitable friction material so as to increase the resistance of the wheels to relative or independent rotation during braking. Inasmuch as the independently rotatable braking members are provided with contacting faces which engage during braking, the independent braking members may be rigidly or axially movably connected to their respective wheels, and the load upon the thrust bearings between the wheels is not materially increased during braking, as is the case with many other types of brakes.

It will be understood that the foregoing general description, and the following detailed description as well, are exemplary and explanatory of the invention, but are not restrictive thereof.

Referring now in detail to the illustrative embodiment of the invention as shown in Figures 1 and 2 of the drawings, the invention is shown as applied to a set of independently rotatable non-driven or trailing dual wheels. The outer wheel 10 is provided with an integral hub portion 12 which extends inwardly for a considerable distance and is mounted for rotation with respect to the axle 14 by means of the bearings 16 and 17. The outer portion of the hub 12 is cylindrical and forms a bearing surface for the bushings 18 and 19 which are seated in the interior of the cylindrical outer hub 20, at the outer end of which is the integral inner wheel 22. Thrust bearings 24 and 25 are provided to take the thrust load between the inner and outer wheels 10 and 22, while their independent rotation is permitted by the bushings 18 and 19.

Each of the wheels 10 and 22 is provided with a suitable tire mounting rim 28 secured to its respective wheel in any desired manner. The inner wheel 22 is maintained in its proper axial relation with respect to the outer wheel 10 by means of a disc-like flange or plate 30 bolted to the inner end of the inner hub 12 by means of the cap screws 32.

The illustrative braking means shown in the drawings comprises two independently rotatable brake members 36 and 38 which cooperate with and may be frictionally engaged by non-rotatable brake shoes 40 and 42 respectively. The braking member 36 comprises an integral internally apertured disc-like member which is formed as a pair of discs 45 and 46 concentric with respect to each other and spaced apart by means of the integral ribs 47 extending in a generally radial direction. The spaces between the discs 45 and 46, and the ribs 47 are open towards the center of the brake member 36 as well as at its exterior to allow free flow of a large volume of air between the discs 45 and 46. A relatively large number of the ribs 47 are provided so as to provide a strong, non-warping brake member, as well as to impel by centrifugal action a relatively large volume of air at a relatively high velocity between the discs 45 and 46 during the rotation of the brake member 36.

Brake member 38 is generally of the same construction as brake member 36, comprising the disc-like portions 50 and 51, and the generally radially extending ribs 52, and discs 50 and 51 are preferably concentric and of the same internal diameter as the disc-like portions 45 and 46. However, the overall diameter of the brake member 38 is preferably somewhat smaller than the overall diameter of the brake member 36, and the disc-like portion 51, on its side adjacent the disc-like portion 46 is provided with a ring of friction material or brake lining 54 riveted to the brake member 38 and adapted to contact with the adjacent face of the brake member 36.

Brake member 36 is carried by the inner wheel 22 and is held against relative rotation with respect thereto by means of the cylindrical extension 56 projecting integrally from the wheel 22, and optionally formed integral therewith, while the brake member 36 is secured thereto by means of suitable lugs and cap screws 58.

The other brake member 38 is mounted on and held against relative rotation with respect to the outer wheel by means of the disc-like flange 30 which has its outer periphery formed with a relatively large number of teeth 60 which are interfitted with the complementary crown teeth 62 extending outwardly from and optionally formed integral with the outer periphery of the brake member 38, thereby holding the brake member 38 and the outer wheel 10 in coaxial relation and against relative rotation, at the same time permitting the brake member 38 to have slight axial movement with respect to the outer wheel 10 as well as the inner wheel brake member 36.

The inner and outer wheel brake members 36 and 38 are preferably held lightly in engagement with each other to prevent the accumulation of dirt between them, as well as to prevent excessive noise. For this purpose the outwardly extending portion of the brake member 38 is provided with axial spring seats 64 between the teeth 62, these seats carrying small compression springs bearing against the inner face of the teeth 60 to urge the brake member 38 and its brake lining 54 lightly into contact with the outer face of the brake member 36.

The cooperating brake shoes 40 and 42 are supported on the axle and anchored against rotation by means of the spider 70, the ends of which are provided with axially extending guides 72 spaced equidistant from the center of the axle, and substantially uniformly spaced with respect to each other. On the guides 72 are carried individual C-shaped yokes 74 having their ends extending outwardly and being slidable on the guides 72. The outboard end 76 of each of the yokes 74 is bolted to the brake shoe disc 42 by means of cap screws 78, providing a plurality of equally spaced, axially movable supports for the brake shoe 42, thereby holding the brake shoe against rotational movement, holding it concentric with respect to the wheels and brake members, and at the same time allowing it to have sufficient axial movement so that it can be moved into engagement with the outer face of the outer wheel brake member 38.

The brake shoe 40 is generally similar to the brake shoe 42 but is slidably mounted on the yokes 74 near their inboard ends by means of a plurality of paired guide lugs 80, 81 formed on the inner edge of brake shoe 40 and in slidable contact with the sides of yokes 74. Thus, axial movement of brake shoe 40, relative to the yokes 74 and to brake members 36 and 38 may be effected to apply the braking action.

Means are provided for bringing the brake shoes 40, 42 towards each other and into braking contact with the brake members 36 and 38 and, as shown, comprise a plurality of fluid actuated diaphragm members 82 which may be secured by cap screws to the inboard end of yokes 74 and consist of an expandable diaphragm 83, sealed within a housing 84 by a flange closure member 85. Slidably mounted within the closure member 85 is a plunger disc 86 the face of which is in contact with the diaphragm 83 and adapted to be actuated thereby.

The fluid pressure for expanding the diaphragm 83 may be admitted to the chamber in the housing 84 through pipe connections 87 each of which is preferably connected to a common source (not shown) of fluid pressure controlled in the usual manner by a foot or hand brake device.

The movement of each of the plunger discs 86, as pressure is applied to diaphragms 83, is transmitted to the brake shoe 40 through an adjustable stud bolt 88 one end of which is seated in a flared recess in the hub of disc 86 and the opposite end secured in a threaded boss 89 on the brake shoe 40 where it may be held in the properly adjusted position by check nut 90.

To maintain the brake shoes 40, 42 in non-braking position or return them thereto after the brake pedal pressure has been released there is provided a plurality of compression springs 95 the ends of which abut on inwardly projecting ears 96 and 97 formed on the inner edge of brake shoes 40, 42, and held in alinement by guide rods 98 which are mounted in apertures in ears 96, 97.

The operation of the braking mechanism is as follows: As pressure is admitted to the diaphragm members 82 the brake shoe 40 is moved outwardly (left in Fig. 1) until it contacts brake member 36 which may be rotating but has no axial movement. Brake shoe 40 then ceases to move and becomes the reactance base for the inward axial movement of the yokes 74 and with them the brake shoe 42. As brake shoe 42 contacts brake member 38 the latter is pressed into strong contact with brake member 36. Thus, both brake members 36 and 38, to which are attached the wheels 22 and 10 are retarded in their rotation by the pinching action between brake shoes 40, 42 even though the wheels and their brake members are rotating at different speeds such as when the vehicle is running in a curved path.

When pressure is released in the diaphragm members 82 the compression springs 95 return the brake shoes 40, 42 to their non-braking positions, thereby permitting the free rotation of the wheels 22 and 10.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheel assembly the combination of a pair of independently rotatable dual wheels mounted for coaxial rotation, a pair of coaxial side by side brake members, one connected to each wheel, a pair of spaced apart brake members held against rotation, and between which the first pair of brake members is located, and means for forcing the second pair of brake members relatively towards each other and into braking engagement with the brake members of the first pair.

2. In a dual wheel assembly the combination of a pair of independently rotatable dual wheels mounted for coaxial rotation, a pair of coaxial side by side brake members, one connected to each wheel, each of said brake members including a disc extending in a substantially radial plane, a pair of spaced apart brake members held against rotation and having disc-like surfaces between which the first pair of brake members is located, and means for moving the second pair of brake members toward and from each other and into braking engagement with the brake members of the first pair.

3. In a dual wheel assembly the combination of a pair of independently rotatable dual wheels mounted for coaxial rotation, a pair of coaxial side by side brake members, one connected to each wheel, each of said brake members comprising a double walled disc having substantially radial air passages between its walls, and means for frictionally engaging at least one wall of each brake member to retard its rotation as well as that of the wheels.

4. In a dual wheel assembly the combination of a pair of independently rotatable dual wheels mounted for coaxial rotation, a pair of coaxial side by side brake members, one connected to each wheel, each of said brake members comprising a pair of disc-like members rigidly spaced apart to provide an air passage therebetween, a pair of brake shoes held against rotation and engageable with the outermost disc of each brake member, and means for forcing the brake shoes towards each other and into engagement with the brake discs.

5. In a dual wheel assembly the combination of a pair of independently rotatable dual wheels mounted for coaxial rotation, a pair of coaxial side by side brake members, one connected to each wheel, each of said brake members comprising a pair of disc-like members rigidly spaced apart to provide an air passage therebetween, a friction facing on one of the disc-like members between it and the adjacent disc-like member of the other brake member, and means for frictionally engaging the outermost disc-like members to retard the rotation of the wheels, and to press the adjacent faces of the brake members together to oppose relative rotation of the wheels.

6. In a dual wheel assembly the combination of a pair of independently rotatable dual wheels mounted for coaxial rotation, a pair of coaxial side by side brake members, one connected to each wheel, one of said brake members being axially movable with respect to its wheel whereby the brake members may be axially moved relative to each other and into contact with each other, and means for forcing said brake members together and for frictionally retarding their rotation to clutch the wheels together while the wheels are braking.

7. In a dual wheel assembly the combination of a pair of relatively rotatable dual wheels mounted for coaxial rotation, a pair of coaxial side by side brake members, of generally disc-like form, connected to said wheels, a pair of spaced-apart brake members held against rotation and between which the first pair of brake members is located, and means for forcing the second pair of brake members towards each other and into braking engagement with the first pair of brake members.

8. In a dual wheel assembly, the combination of a pair of relatively rotatable dual wheels mounted for coaxial rotation, a pair of coaxial side by side brake members connected to said wheels, said brake members being of generally disc-like form, and one of said brake members being mounted for slight axial movement, a pair of spaced-apart brake members held against rotation, and having axial movement with respect to each other and the first pair of brake members, and means for forcing the second pair of brake members towards each other and into braking engagement with the brake members of the first pair.

9. In a dual wheel assembly, the combination of a pair of brake members each comprising a pair of disc-like walls rigidly spaced apart by ribs extending in a generally radial direction to provide air passageways between said walls, one of said brake members being connected to a cylindrical member extending laterally therefrom by which it may be secured to a wheel, the other brake member being connected to a cylindrical portion of lesser diameter and nested within the larger cylinder, said cylindrical portion being provided with crown-like teeth by which it may be connected to another wheel for relative axial movement and held against rotational movement with respect to said other wheel.

10. In a dual wheel assembly, the combination of a pair of relatively rotatable coaxial wheels, a pair of generally disc-like brake members connected to said wheels and having slight relative axial movement so that their adjacent faces may be brought into contact, each of said brake members having generally radial air passages internally thereof, and a pair of brake shoes movable toward and from each other and having disc-like friction faces to engage the outermost faces of said brake members so that the brake members are retarded and pressed into contact with each other as the brake shoes are moved towards each other.

11. In a dual wheel assembly the combination of a pair of coaxial independently rotatable side by side brake members, one being connected to each wheel of the dual wheel assembly, each member comprising a pair of discs fast to each other and spaced apart to provide an air passage therebetween, a pair of disc-like brake shoes movable toward and from each other, and between which the brake members are positioned, and means for moving the brake shoes into and out of braking contact with the outer disc-like faces of the brake members.

12. In a dual wheel assembly the combination of a pair of independently rotatable coaxial brake members of generally disc-like form, one being connected to each wheel of the dual wheel assembly, a friction facing between said members and attached to one of the members, a pair of brake shoes movable toward and from each other and between which the brake members are positioned for braking contact with the brake shoes, and means for moving said shoes toward and from each other for braking contact with the outer faces of the brake members and to force the adjacent faces against each other to prevent relative rotation of the brake members.

CHARLES S. ASH.